(12) United States Patent
Ikeda

(10) Patent No.: US 11,462,775 B2
(45) Date of Patent: Oct. 4, 2022

(54) MANUFACTURING METHOD FOR NON-AQUEOUS ELECTROLYTE SECONDARY BATTERY

(71) Applicant: TOYOTA JIDOSHA KABUSHIKI KAISHA, Toyota (JP)

(72) Inventor: Hiroaki Ikeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 255 days.

(21) Appl. No.: 16/927,105

(22) Filed: Jul. 13, 2020

(65) Prior Publication Data

US 2021/0066764 A1 Mar. 4, 2021

(30) Foreign Application Priority Data

Aug. 28, 2019 (JP) .............................. JP2019-155579

(51) Int. Cl.
*H01M 4/82* (2006.01)
*H01M 10/44* (2006.01)
*H01M 4/139* (2010.01)
*H01M 10/0569* (2010.01)
*H01M 10/0525* (2010.01)

(52) U.S. Cl.
CPC ......... *H01M 10/446* (2013.01); *H01M 4/139* (2013.01); *H01M 10/0525* (2013.01); *H01M 10/0569* (2013.01)

(58) Field of Classification Search
CPC .. H01M 10/446; H01M 10/44; H01M 10/448; H01M 10/4235; H01M 10/0525; H01M 10/0569; H01M 10/0567; H01M 10/0566; H01M 4/139; H01M 4/1391; H01M 4/0445; H01M 4/0404
See application file for complete search history.

(56) References Cited

U.S. PATENT DOCUMENTS

| | | | |
|---|---|---|---|
| 2002/0034678 A1 | 3/2002 | Shibuya et al. | |
| 2016/0233691 A1 | 8/2016 | Sumi et al. | |
| 2016/0329613 A1* | 11/2016 | Kusachi | H01M 4/133 |
| 2019/0036155 A1* | 1/2019 | Ahn | H01M 10/0525 |
| 2019/0393564 A1* | 12/2019 | Miura | H01M 10/48 |

FOREIGN PATENT DOCUMENTS

| | | |
|---|---|---|
| JP | 2001-176560 A | 6/2001 |
| JP | 2001-325988 A | 11/2001 |
| JP | 2014-232704 A | 12/2014 |
| JP | 2016-015280 A | 1/2016 |
| JP | 2016-149211 A | 8/2016 |

\* cited by examiner

*Primary Examiner* — Raymond Alejandro
(74) *Attorney, Agent, or Firm* — Sughrue Mion, PLLC

(57) ABSTRACT

A manufacturing method for a non-aqueous electrolyte secondary battery includes preparing a battery assembly, and performing an initial charging on the battery assembly. In the initial charging, a differential capacity curve of the battery assembly has a first peak voltage at which a first layer is formed on the electrode body and a second peak voltage at which a second layer is formed on the electrode body. The initial charging includes forming the first layer by stopping charging for a first stop time after charging to a first specified voltage that is set between the first peak voltage and the second peak voltage, and forming a second layer with charging performed to a second specified voltage that is set higher than the second peak voltage after forming the first layer.

8 Claims, 3 Drawing Sheets

MANUFACTURING METHOD FOR NON-AQUEOUS ELECTROLYTE SECONDARY BATTERY

INCORPORATION BY REFERENCE

The disclosure of Japanese Patent Application No. 2019-155579 filed on Aug. 28, 2019 including the specification, drawings and abstract is incorporated herein by reference in its entirety.

BACKGROUND

1. Technical Field

The disclosure relates to a manufacturing method for a non-aqueous electrolyte secondary battery in which an initial charging step is performed for a battery assembly.

2. Description of Related Art

In recent years, non-aqueous electrolyte secondary batteries such as lithium ion secondary batteries and nickel hydride batteries have been preferably used as so-called portable power supplies such as personal computers and mobile terminals and power supplies for driving a vehicle. Normally in manufacturing these non-aqueous electrolyte secondary batteries, a battery assembly in which an electrode body and a non-aqueous electrolyte are accommodated in a battery case is prepared, and then an initial charging step (conditioning) is performed for the battery assembly. Thus, power generation elements (electrode body and non-aqueous electrolyte) are activated, and a non-aqueous electrolyte secondary battery is manufactured.

When the initial charging step is performed, a part of a solvent of the non-aqueous electrolyte is decomposed, and a solid electrolyte interface (SEI) layer is formed on the surface of the electrode (typically a negative electrode). With the SEI layer formed suitably, internal resistance is suppressed and output characteristics are improved. Japanese Unexamined Patent Application Publication No. 2016-149211 (JP 2016-149211 A) and Japanese Unexamined Patent Application Publication No. 2016-15280 (JP 2016-15280 A) disclose examples of a method for forming the SEI layer suitably. Further, Japanese Unexamined Patent Application Publication No. 2001-176560 (JP 2001-176560 A) discloses a method for performing an initial charging step and then performing an initial adjusting step of repeating charging and discharging cycles including a stop, to stabilize battery characteristics in a short time.

For example, JP 2016-149211 A discloses a technique of initially charging a cell (battery assembly) at a preset specified voltage. In JP 2016-149211 A, the specified voltage in the initial charging is set based on a peak voltage indicated in a differential capacity curve observed during charging. Further, according to the method described in JP 2016-149211 A, when a plurality of peak voltages are observed in the differential capacity curve, a plurality of specified voltages are set based on each peak voltage, and constant current constant voltage charging (CCCV charging) is performed stepwise from low voltage to high voltage based on the specified voltages. Thus, constant voltage (CV) charging can be performed at a decomposing voltage for each material (precursor of the SEI layer), so that the SEI layer can be formed with high accuracy.

SUMMARY

According to the method disclosed in JP 2016-149211 A described above, a high-output non-aqueous electrolyte secondary battery can be manufactured by forming a suitable SEI layer. However, due to a recent increase in the demand for output characteristics in the field of non-aqueous electrolyte secondary batteries, development of a technique capable of forming a more suitable SEI layer has been desired. The disclosure provides a manufacturing method capable of forming a suitable SEI layer in an initial charging step and manufacturing a high-output non-aqueous electrolyte secondary battery.

The manufacturing method according to a first aspect of the disclosure includes preparing a battery assembly in which an electrode body and a non-aqueous electrolyte are accommodated in a battery case, and performing an initial charging on the battery assembly. In the initial charging, a differential capacity curve of the battery assembly has a first peak voltage at which a first layer is formed on the electrode body and a second peak voltage that is a voltage higher than the first peak voltage and at which a second layer is formed on the electrode body. The initial charging includes forming the first layer by stopping charging for a first stop time after charging to a first specified voltage that is set between the first peak voltage and the second peak voltage, and forming a second layer with charging performed to a second specified voltage that is set higher than the second peak voltage after forming the first layer. The "differential capacity curve" in the present specification is defined in a graph showing the relationship between the voltage and a differential capacity (dQ/dV) obtained by differentiating the charging/discharging capacity with the voltage.

In the first layer forming step of the manufacturing method disclosed in the disclosure, after charging at the first specified voltage, charging is stopped for a predetermined time. This makes it possible to rapidly mitigate overvoltage in the first layer forming step, thereby suppressing the first layer and the second layer from being formed simultaneously in the first layer forming step. As a result, each of the first layer and the second layer can be formed with high accuracy without causing a significant decrease in production efficiency. Therefore, a high-output non-aqueous electrolyte secondary battery with an SEI layer formed suitably can be manufactured efficiently.

According to the first aspect of the disclosure, the first stop time in forming the first layer may be 2 to 30 seconds. Thereby, the overvoltage in the first layer forming step can be suitably mitigated in a short time.

According to the first aspect of the disclosure, in forming the second layer, the charging may be stopped for a second stop time after the charging is performed to the second specified voltage. It has been confirmed by experiments that a non-aqueous electrolyte secondary battery with a higher output can be manufactured by stopping charging in the second layer forming step as described above.

According to the first aspect of the disclosure, the second stop time in forming the second layer may be 2 to 30 seconds. Thereby, a non-aqueous electrolyte secondary battery with a higher output can be manufactured efficiently.

According to the first aspect of the disclosure, the non-aqueous electrolyte may include a layer-forming agent and a solvent. The first layer may be a solid electrolyte interface (SEI) layer formed by the layer-forming agent being decomposed. The second layer may be an SEI layer formed by the solvent being decomposed. The output improvement effect of the manufacturing method disclosed in the disclosure is particularly suitably exhibited when a non-aqueous electrolyte containing such a layer-forming agent is used.

According to the first aspect of the disclosure, the layer-forming agent may be lithium bis (oxalate) borate (LiBOB).

LiBOB can form a particularly suitable SEI layer among various layer-forming agents, and can contribute to improving output characteristics.

According to the first aspect of the disclosure, forming the first layer may include performing a constant current (CC) charging in which a voltage is increased until the voltage reaches the first specified voltage, and performing a constant voltage (CV) charging in which the voltage is maintained at the first specified voltage for a predetermined time. In the first layer forming step, by performing the CCCV charging including the CC charging and the CV charging, charging at the first specified voltage can be stably performed, so that a suitable SEI layer can be easily formed.

According to the first aspect of the disclosure, forming the second layer may include performing a CC charging in which a voltage is increased until the voltage reaches the second specified voltage, and performing a CV charging in which the voltage is maintained at the second specified voltage for a predetermined time. Also in the second layer forming step, charging can be stably performed by performing the CCCV charging, so that a suitable SEI layer can be easily formed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The inventors of the disclosure conducted various experiments and studies. Hereinafter, the studies made by the inventors will be described.

As described above, in the related art, when a plurality of peak voltages are observed in a differential capacity curve, a plurality of specified voltages are set based on each peak voltage, and a charging voltage is increased stepwise based on the specified voltages. For example, when two peak voltages are observed, charging at a first specified voltage and then charging at a second specified voltage allows two types of precursors of a solid electrolyte interface (SEI) layer to be decomposed individually. As a result of conducting various studies to form a more suitable SEI layer, the inventors have found that there was room for improvement in the above technique. Specifically, the inventors have found that the precursor to be decomposed by charging at the second specified voltage may be decomposed during charging at the first specified voltage, which may cause deterioration in formation accuracy of the SEI layer. This is presumed to be because an overvoltage occurs during the charging at the first specified voltage, causing two types of precursors to be decomposed simultaneously.

To improve the above condition, the inventors studied means for mitigating the overvoltage during charging at the first specified voltage and suppressing two or more precursors from being decomposed simultaneously. As a means for mitigating the overvoltage, a method for maintaining low-current charging (cut charging) for a long time after reaching the first specified voltage can be conceived. However, employing this method may prolong the initial charging step and significantly decrease production efficiency. Therefore, the inventors made further studies and came to a conclusion to temporarily stop charging after charging at the first specified voltage. As a result of conducting various experiments, the inventors have found that since the overvoltage is rapidly mitigated by the charging stop, it is possible to suppress a decrease in the formation accuracy of the SEI layer without causing a significant decrease in the production efficiency.

The manufacturing method for a non-aqueous electrolyte disclosed in the disclosure (hereinafter also simply referred to as "manufacturing method") is based on the above findings.

Hereinafter, the embodiments of the disclosure will be described. Matters other than those specifically mentioned in the disclosure and that are necessary for implementing the disclosure may be understood as a matter of design for those skilled in the art based on the related art. The disclosure can be implemented based on the content disclosed in this specification and general technical knowledge in the art.

A. First Embodiment

Figure 1:
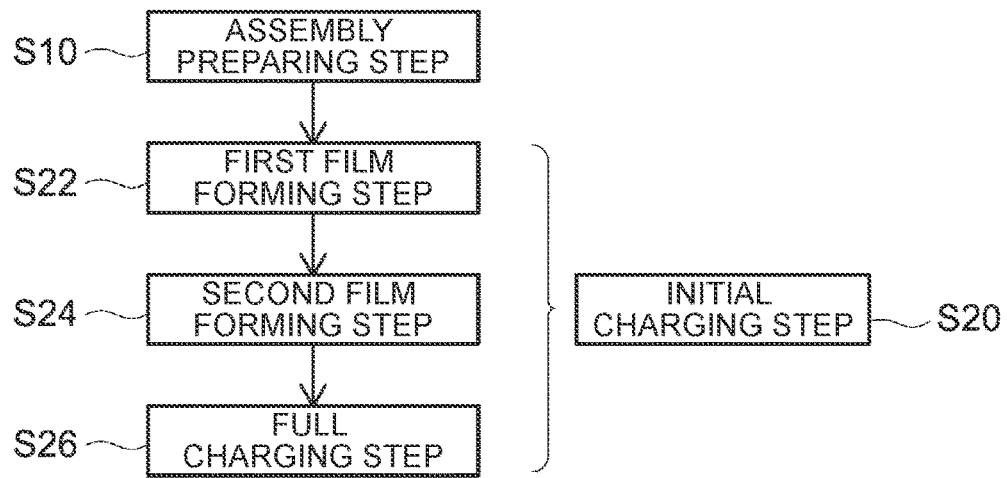
FIG. 1 is a flowchart showing steps of a manufacturing method according to an embodiment of the disclosure.

Hereinafter, a manufacturing method for a lithium ion secondary battery will be described as an embodiment of a manufacturing method for a non-aqueous electrolyte secondary battery disclosed in the disclosure. FIG. 1 is a flowchart showing a manufacturing method according to the first embodiment of the disclosure. As shown in FIG. 1, the manufacturing method according to the present embodiment includes an assembly preparing step S10 and an initial charging step S20. Hereinafter, each step will be described.

1. Assembly Preparing Step S10

In the manufacturing method according to the present embodiment, first, an assembly preparing step S10 is performed for preparing a battery assembly in which an electrode body and a non-aqueous electrolyte are accommodated in a battery case. The "battery assembly" in this specification refers to a non-aqueous electrolyte secondary battery before being activated by initial charging. In this step, a battery assembly may be manufactured based on a known procedure, or a battery assembly manufactured in advance may be prepared.

Figure 2:
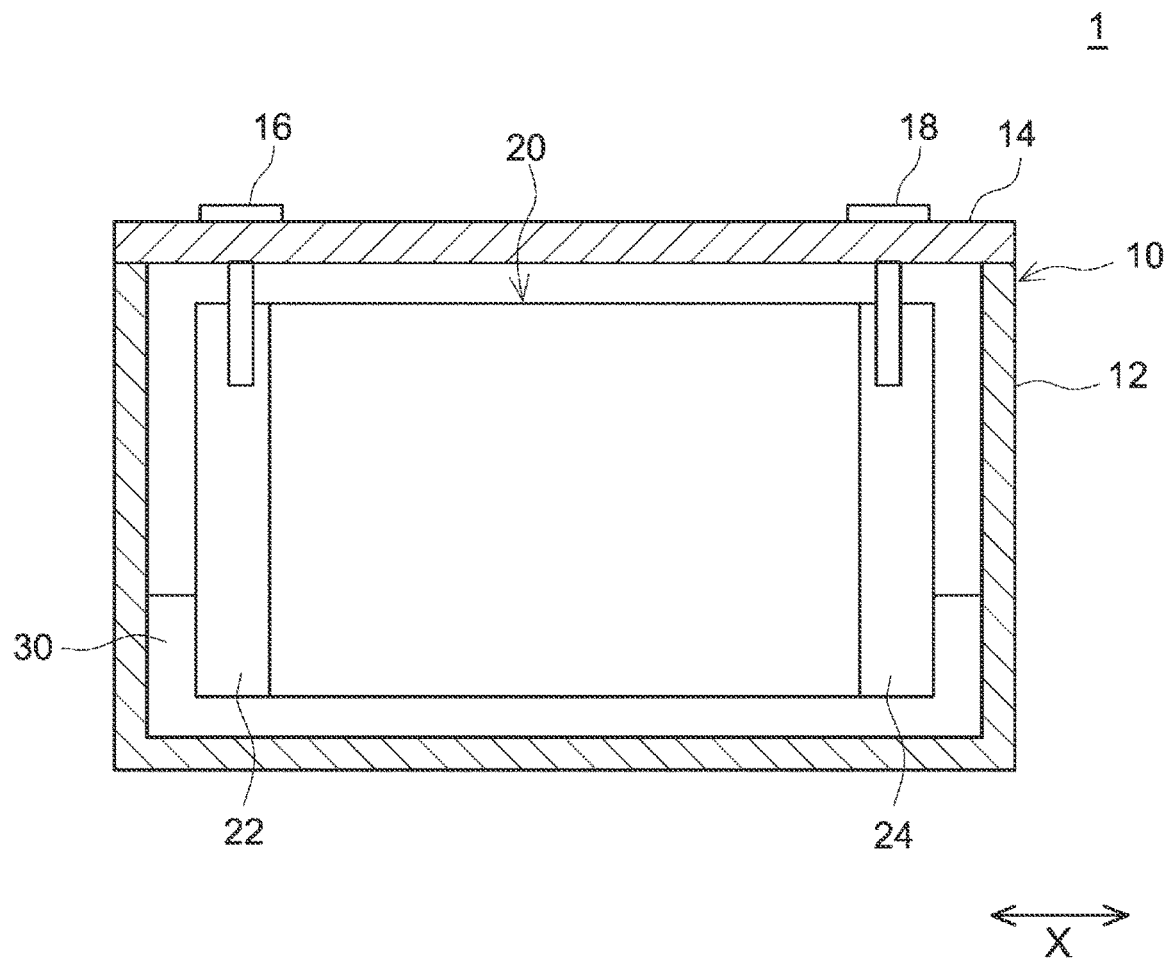
FIG. 2 is a front view schematically showing an internal structure of a battery assembly prepared in the manufacturing method according to the embodiment of the disclosure.

FIG. 2 is a front view schematically showing an internal structure of the battery assembly prepared in the manufacturing method according to the present embodiment. As shown in FIG. 2, a battery assembly 1 is manufactured by accommodating an electrode body 20 and a non-aqueous electrolyte 30 in a battery case 10. Hereinafter, each component of the battery assembly 1 will be described.

Battery Case

The battery case 10 is a flat rectangular container made of a metal material such as aluminum, stainless steel, nickel-plated steel, or the like. The battery case 10 includes a case body 12 and a lid 14. The case body 12 is a flat, box-shaped container having an upper opening. The lid 14 is a plate-shaped member that closes the upper opening of the case body 12. A positive electrode terminal 16 and a negative electrode terminal 18 are attached to the lid 14.

Electrode Body

The electrode body 20 in the present embodiment is a wound electrode body. Such a wound electrode body is produced by stacking long sheet-shaped electrodes (a positive electrode and a negative electrode) with a separator interposed therebetween, and winding the stack. A positive electrode connecting portion 22 formed by winding only a positive electrode current collector is provided on one end of the electrode body 20 in a width direction X of the electrode body 20, and a negative electrode connecting portion 24 formed by winding only a negative electrode current collector is provided on the other end of the electrode body 20 in the width direction X of the electrode body 20. The positive electrode terminal 16 is connected to the positive electrode connecting portion 22, and the negative electrode terminal 18 is connected to the negative electrode connecting portion 24. Detailed description of members constituting the electrode body 20 (typically a positive electrode, a negative electrode, and a separator) will be omitted because members used in a general lithium ion secondary battery can be used as without any particular limitation and the members constituting the electrode body 20 do not characterize the technique disclosed in the disclosure. Further, the structure of the electrode body 20 is not limited to the wound electrode body described above, and any structure that can be employed as an electrode body of a general secondary battery can be employed without any particular limitation. Another example of the structure of the electrode body 20 is a stacked electrode body in which a plurality of positive electrodes, negative electrodes, and separators are stacked.

Non-Aqueous Electrolyte

The non-aqueous electrolyte 30 is accommodated in the battery case 10 along with the electrode body 20. In FIG. 2, a part of the non-aqueous electrolyte 30 is infiltrated into the electrode body 20 (typically between the positive electrode and the negative electrode), and the remaining non-aqueous electrolyte 30 is present outside the electrode body 20. The injected amount of the non-aqueous electrolyte 30 is not particularly limited, and may be such that all of the non-aqueous electrolyte 30 infiltrates into the electrode body 20.

The non-aqueous electrolyte 30 in the present embodiment contains a supporting salt, a layer-forming agent, and a solvent. For example, a lithium salt is used as the supporting salt. Specific examples of the supporting salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis (trifluoromethanesulfonyl) imide ($Li(CF_3SO_2)_2N$), lithium bis (fluorosulfonyl) imide ($Li(FSO_2)_2N$), and lithium trifluoromethanesulfonate ($LiCF_3SO_3$). The non-aqueous electrolyte 30 may contain two or more types of the supporting salt described above. The concentration of the supporting salt in the non-aqueous electrolyte 30 is preferably, for example, about 0.5 to 2.0 mol/l.

The layer-forming agent employs a compound that decomposes at a lower voltage than other components (typically the solvent) of the non-aqueous electrolyte 30 do and that forms an SEI layer on the surface of an electrode (typically a negative electrode). Adding this layer-forming agent to the non-aqueous electrolyte 30 suppresses a decrease in battery capacity due to decomposition of the solvent, and a suitable SEI layer can be formed. Examples of such a layer-forming agent include lithium bis (oxalate) borate (LiBOB:$LiB(C_2O_4)_2$), lithium difluorooxalate borate ($LiBF_2(C_2O_4)$), lithium difluorobis (oxalate) phosphate ($LiPF_2(C_2O_4)_2$), lithium difluorophosphate ($LiPO_2F_2$), vinylene carbonate (VC), vinylethylene carbonate (VEC), fluoroethylene carbonate (FEC), ethylene sulfite (ES), and propane sultone (PS). The non-aqueous electrolyte 30 may contain only one type of the layer-forming agents described above, or may contain two or more types of the layer-forming agents described above. Of the layer-forming agents described above, LiBOB is preferable because a particularly suitable SEI layer can be formed. In view of suitably suppressing the decomposition of the solvent, the concentration of the layer-forming agent in the non-aqueous electrolyte 30 is preferably 0.02 wt % or more, more preferably 0.1 wt % or more, and further preferably 0.3 wt % or more. On the other hand, in view of suppressing the layer-forming agent from remaining after the initial charging step, the upper limit of the concentration of the layer-forming agent is preferably 3 wt % or less, more preferably 2 wt % or less, and further preferably 1 wt % or less.

As the solvent, a non-aqueous solvent that can dissolve the supporting salt and the layer-forming agent described above can be used. Examples of such a solvent include cyclic carbonates such as ethylene carbonate (EC), propylene carbonate (PC), butylene carbonate (BC), and γ-butyrolactone (γBL), and chain carbonates such as dimethyl carbonate (DMC), ethyl methyl carbonate (EMC), and diethyl carbonate (DEC). As the solvent, only one type of the non-aqueous solvents described above may be used, or a mixed solvent of two or more types of non-aqueous solvents that are mixed together may be used. When a mixed solvent is used, a mixture of cyclic carbonates and chain carbonates is preferably used. Thereby, both the electric conductivity and the electrochemical stability of the non-aqueous electrolyte can be achieved at a high level. Preferred examples of such a mixed solvent include a mixed solvent of EC, DMC, and EMC.

Peak Voltage

Figure 3:
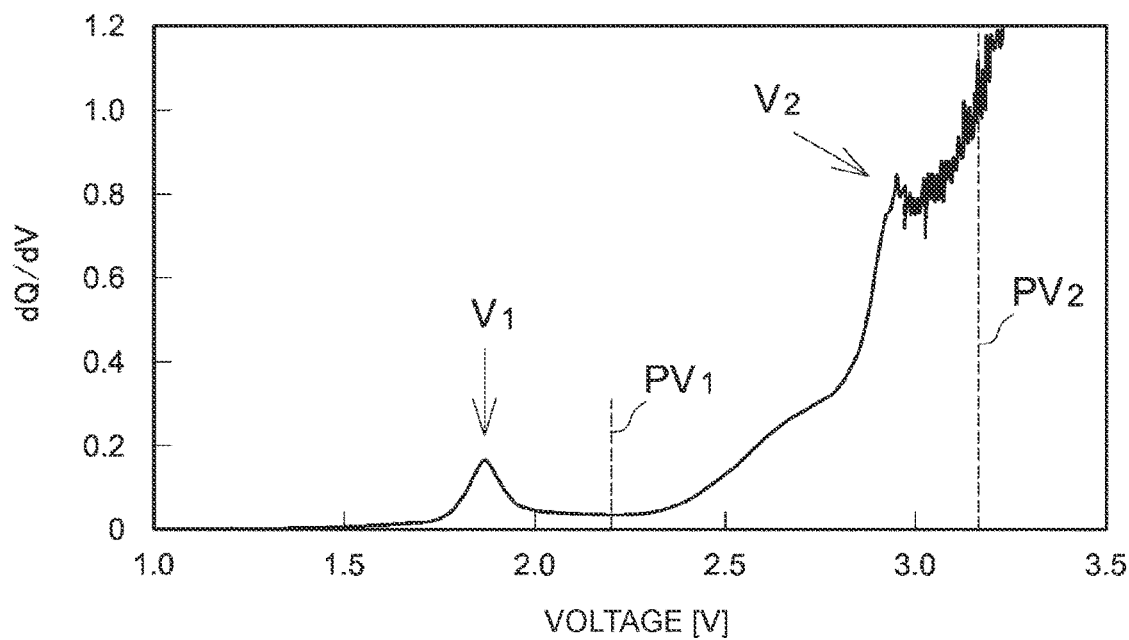
FIG. 3 is a graph showing a differential capacity curve when the battery assembly is charged.

FIG. 3 is a graph showing a differential capacity curve when the battery assembly is charged. As shown in FIG. 3, the differential capacity curve observed in the initial charging of the battery assembly 1 used in the present embodiment has a first peak voltage $V_1$ at which a first layer is formed on the electrode body and a second peak voltage $V_2$ that is higher than the first peak voltage $V_1$ and at which a second layer is formed on the electrode body. The vertical axis in FIG. 3 indicates "differential capacity (dQ/dV)", and the horizontal axis indicates "voltage (V)". The "differential capacity (dQ/dV)" indicates the amount of change in capacity per unit voltage. The differential capacity (dQ/dV) serves as an index indicating a reaction amount of a layer-forming reaction in which the precursor such as the layer-forming agent or the solvent is decomposed to form an SEI layer. Specifically, assuming that the internal resistance of the battery is constant, the voltage when performing constant current charging (CC charging) changes depending on the degree of the layer-forming reaction. That is, when the voltage exceeds the voltage (peak voltage) at which the differential capacity (dQ/dV) increases, the reaction amount of the layer-forming reaction increases. The "differential capacity curve" in the present specification is indicated in a graph showing the relationship between the voltage and the differential capacity (dQ/dV) obtained by differentiating the charging/discharging capacity with the voltage. Such a differential capacity curve can be obtained, for example, based on the procedure disclosed in JP 2016-149211 A. For example, as shown in the differential capacity curve in FIG. 3, when the battery assembly 1 using the non-aqueous electrolyte 30 containing the layer-forming agent and the solvent is charged, the differential capacity curve indicates a first peak voltage $V_1$ when the first layer is formed from the layer-forming agent that is decomposed at a relatively low voltage (about 1.8 V in FIG. 3), and the differential capacity curve indicates a second peak voltage $V_2$ when the second layer is formed from the solvent that is decomposed at a higher voltage than the layer-forming agent (about 2.9 V in FIG. 3) is.

2. Initial Charging Step S20

In the initial charging step S20, the battery assembly 1 described above is initially charged. This "initial charging" refers to the process of charging the battery assembly before a power generation element is activated such that the voltage is gradually increased within a voltage range (0 V to 4 V in the present embodiment) to be used after manufacturing the battery assembly. The initial charging activates the power generation elements (typically the electrode body 20 and the non-aqueous electrolyte 30) of the battery assembly 1. In addition, the precursors of the SEI layer (for example, the layer-forming agent and the solvent) that are present in the battery case 10 are decomposed, and the SEI layer is formed on the electrode body (typically the negative electrode).

Figure 4:
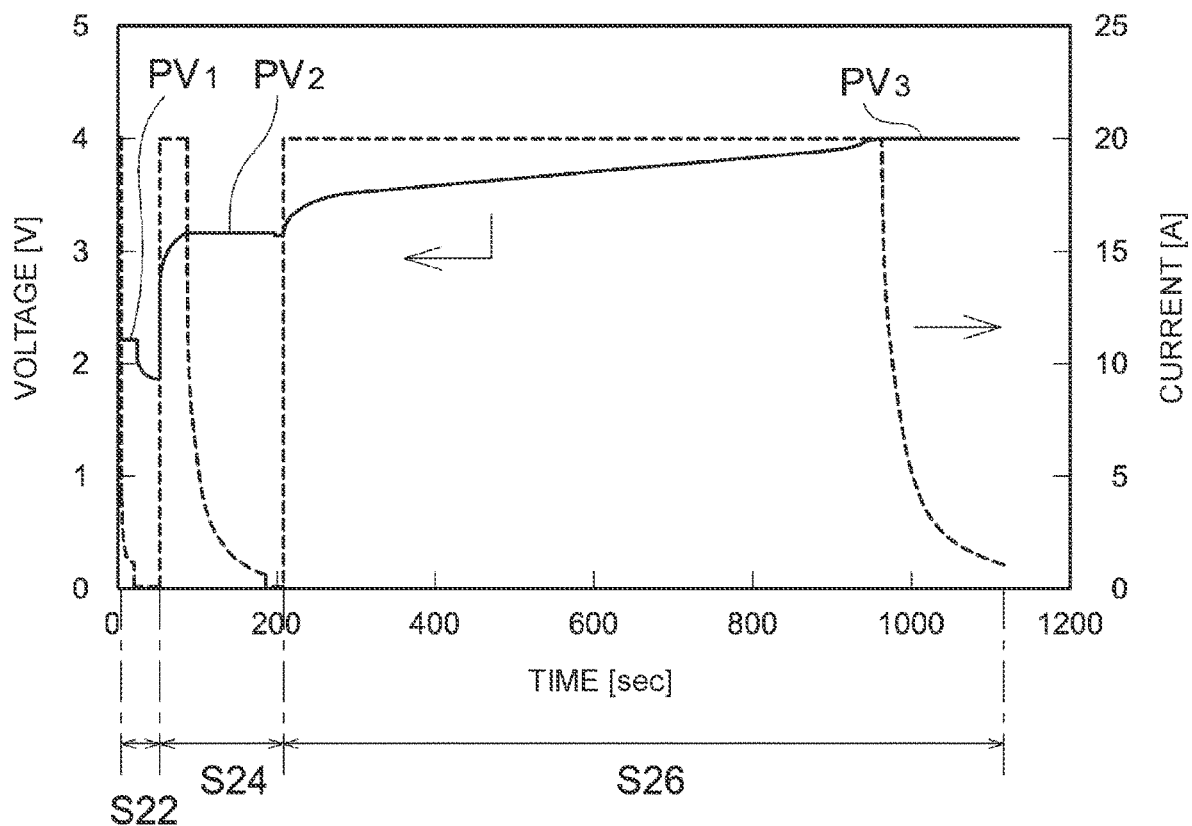
FIG. 4 is a graph showing a change over time in a charging current and a charging voltage in an initial charging step of the manufacturing method according to the embodiment of the disclosure.

As shown in FIG. 1, the initial charging step S20 of the manufacturing method according to the present embodiment includes a first layer forming step S22 and a second layer forming step S24. In the present embodiment, a full charging step S26 is performed after the second layer forming step S24. FIG. 4 is a graph showing a change over time of a charging current (A) and a charging voltage (V) in the initial charging step including the steps described above.

First Layer Forming Step S22

In the initial charging step S20 of the present embodiment, a first layer forming step S22 is performed first. In step S22, after charging is performed to a first specified voltage $PV_1$ set between the first peak voltage $V_1$ and the second peak voltage $V_2$, the charging is stopped for a predetermined time.

As described above, in the first layer forming step S22, first, the first specified voltage $PV_1$ is set between the first peak voltage $V_1$ and the second peak voltage $V_2$ in the differential capacity curve (see FIG. 3), and as shown in FIG. 4, the charging is performed at the first specified voltage $PV_1$. Thereby, the precursor (the layer-forming agent in the present embodiment) that is decomposed at a relatively low voltage is preferentially decomposed to form the first layer. The first specified voltage $PV_1$ is preferably set between a peak top voltage and a peak end voltage of the first peak voltage $V_1$. Thereby, a more suitable first layer can be formed. In this specification, the "peak top voltage" refers to a voltage at which the differential capacity (dQ/dV) becomes highest at the first peak voltage $V_1$ (1.8 V in FIG. 3). The "peak end voltage" refers to a voltage at which the differential capacity (dQ/dV) starts to increase again toward the second peak voltage $V_2$ (2.2 V in FIG. 3) after the differential capacity (dQ/dV) decreases from the peak top voltage. That is, when the differential capacity curve as shown in FIG. 3 is observed, the first specified voltage $PV_1$ can be set within a range of 1.75 V or more and less than 2.9 V, but to form a more preferable first layer, the first specified voltage $PV_1$ is set within a range of 1.8 V or more and 2.2 V or less.

Charging performed in the first layer forming step S22 is preferably constant current constant voltage charging (CCCV charging) as shown in FIG. 4. Specifically, in the first layer forming step S22, the CC charging is performed until the voltage reaches the first specified voltage $PV_1$, and after reaching the first specified voltage $PV_1$, constant voltage charging (CV charging) is continued for a predetermined time. Thereby, charging at the first specified voltage $PV_1$ can be stably performed, and a suitable first layer can be easily formed. In view of forming the first layer suitably, the CCCV charging time in the first layer forming step S22 is preferably one second or more, more preferably five seconds or more, further preferably 15 seconds or more, and particularly preferably 20 seconds or more. In view of improving the production efficiency, the upper limit of the charging time is preferably 100 seconds or less, more preferably 70 seconds or less, further preferably 50 seconds or less, and particularly preferably 40 seconds or less.

Then, in the first layer forming step S22 of the present embodiment, the charging is stopped after charging at the first specified voltage $PV_1$ described above. As shown in FIG. 4, the formation of the first layer (decomposition of the layer-forming agent) progresses even while the charging is stopped, so that the voltage decreases from the first specified voltage $PV_1$ and overvoltage is rapidly mitigated. Thereby, in the first layer forming step S22, the first layer and the second layer are suppressed from being simultaneously formed, and the first layer can be formed with high accuracy. When the charging is stopped, the charging current normally becomes 0 A as shown in FIG. 4. Note that FIG. 4 does not indicate that a flow of an unintended weak current is eliminated while the charging is stopped.

Further, the stop time in the first layer forming step S22 can be suitably changed depending on the material of the non-aqueous electrolyte, the setting of the first specified voltage $PV_1$, and the like. For example, in view of suitably mitigating the overvoltage, the stop time in the first layer forming step S22 is preferably one second or more, and more preferably two seconds or more. Furthermore, the inventors have confirmed by experiments that the output after manufacture particularly improved significantly when the charging is stopped for five seconds or more in the first layer forming step S22. However, the upper limit of the stop time is not particularly limited, and may be 60 seconds or less. It has also been confirmed that the output improvement effect saturates when the charging is stopped for more than a certain time. Considering this point, the upper limit of the stop time is preferably 30 seconds or less, more preferably 20 seconds or less, and further preferably 15 seconds or less.

Second Layer Forming Step S24

In the present embodiment, in the initial charging step S20, after the first layer forming step S22, a second layer forming step S24 is performed for charging to a second specified voltage $PV_2$ that is set higher than the second peak voltage $V_2$. Thus, the precursor (solvent in the present embodiment) that is decomposed at a voltage equal to or higher than the second peak voltage Vz is decomposed to form the second layer. The second specified voltage $PV_2$ is preferably set to a voltage higher than the peak end voltage (3.0 V in FIG. 3) of the second peak voltage Vz. That is, when the differential capacity curve as shown in FIG. 3 is observed, the second specified voltage $PV_2$ can be set within a range of 2.9 V or more, but in view of forming a more preferable second layer, the voltage is preferably set to 3.0 V or more. The upper limit of the second specified voltage $PV_2$ is not particularly limited, and only needs to be lower than the voltage in the fully charged state (4.0 V in the present embodiment). The upper limit value of the second specified voltage $PV_2$ is set to, for example, 3.18 V.

As in the first layer forming step S22, it is preferable to perform the CCCV charging also in the second layer forming step S24. Specifically, as shown in FIG. 4, in the second layer forming step S24, the CC charging is performed until the voltage reaches the second specified voltage $PV_2$, and after reaching the second specified voltage $PV_2$, the CV charging is continued for a predetermined time. Thereby, the second layer can be easily formed. In view of forming the second layer more suitably, the CCCV charging time in the second layer forming step S24 is preferably 60 seconds or more, more preferably 90 seconds or more, and further preferably 100 seconds ore more, and particularly preferably 120 seconds or more. In view of suppressing a decrease in production efficiency, the upper limit of the charging time in the second layer forming step S24 is preferably 300 seconds or less, more preferably 270 seconds or less, further preferably 210 seconds or less, and particularly preferably 180 seconds or less.

In the manufacturing method according to the present embodiment, in the second layer forming step S24, charging is performed at the second specified voltage $PV_2$ and then the charging is stopped. It has been confirmed by experiments that the output characteristics of the manufactured secondary battery are thereby improved. Although there is no intention to limit the technique disclosed in the disclosure, it is assumed that the output improvement effect is obtained by the charging stop in the second layer forming step S24 because the overvoltage in the second layer forming step S24 is mitigated and excessive decomposition of the solvent is suppressed. In the case where the charging stop is performed in the second layer forming step S24, the stop time is preferably set to one second or more, and more preferably two seconds or more. It has been confirmed by experiments that higher output characteristics can be obtained by performing a charging stop of five seconds or more. Considering the production efficiency, the upper limit of the stop time in the second layer forming step S24 is preferably 30 seconds or less, more preferably 25 seconds or less, further preferably 20 seconds or less, and particularly preferably 15 seconds or less.

Full Charging Step S26

In the manufacturing method according to the present embodiment, after the second layer forming step S24 is performed, the full charging step S26 is performed. In the full charging step S26, a full-charging specified voltage $PV_3$ (4.0 V in FIG. 4) is set based on a standard of the manufactured non-aqueous electrolyte secondary battery, and the CC charging is performed until the voltage reaches the full-charging specified voltage $PV_3$. Then, in the full charging step S26, charging is switched to the CV charging after the voltage reaches the full-charging specified voltage $PV_3$, and charging is ended when the current value decreases to a termination current (1 A in FIG. 4). Although there is no intention to limit the technique disclosed in the disclosure, the implementation time of the full charging step S26 is preferably 500 seconds or more and 1300 seconds or less, more preferably 600 seconds or more and 1200 seconds or less, further preferably 700 seconds or more and 1100 seconds or less, and particularly preferably 800 seconds or more and 1000 seconds or less.

When the full charging step S26 described above is completed, charging is performed within the entire voltage range to be used, and a non-aqueous electrolyte secondary battery with activated power generation elements is manufactured. In the manufacturing method according to the present embodiment, since charging is stopped in the first layer forming step S22, the first layer and the second layer can be individually formed with high accuracy. For this reason, the non-aqueous electrolyte secondary battery manufactured by the manufacturing method according to the present embodiment has a suitable SEI layer and can exhibit high output characteristics. Further, in the manufacturing method according to the present embodiment, since the overvoltage is rapidly mitigated by the charging stop, the production efficiency can be maintained at a higher level as compared with a manufacturing method in which a cut current is maintained for a long time. Therefore, according to the manufacturing method of the present embodiment, a high-output non-aqueous electrolyte secondary battery with a suitable SEI layer formed can be efficiently manufactured.

B. Other Embodiments

As described above, one embodiment (first embodiment) of the manufacturing method disclosed in the disclosure has been described. However, the first embodiment described above is not intended to limit the manufacturing method disclosed in the disclosure, and various changes can be made thereto.

For example, in the first embodiment, a battery assembly using a non-aqueous electrolyte containing a layer-forming agent and a solvent is used. By using a non-aqueous electrolyte containing a layer-forming agent as described above, a suitable SEI layer can be easily formed. However, the charging target in the manufacturing method disclosed in the disclosure is not limited to the embodiment described above. Specifically, when a mixed solvent obtained by mixing a plurality of non-aqueous solvents is used, a plurality of peak voltages may be indicated in the differential capacity curve even though the layer-forming agent is not added. Even when using a battery assembly with a differential capacity curve indicating a plurality of peak voltages due to the mixed solvent as described above, an initial charging step including a first layer forming step, in which charging is performed considering a first peak voltage, and a second layer forming step, in which charging is performed considering a second peak voltage can be performed. By performing a charging stop in the first layer forming step, a high-output non-aqueous electrolyte secondary battery with a suitable SEI layer formed can be manufactured efficiently. Further, when a layer-forming agent is used, the layer-forming agent does not necessarily have to be added to the non-aqueous electrolyte. For example, applying a paste containing a layer-forming agent to a material of an electrode body (for example, the surface of a separator) can form an SEI layer derived from the layer-forming agent. Since a plurality of peak voltages are also indicated in the differential capacity curve, the technique disclosed in the disclosure can be applied to the case described above. Although the first embodiment is applied to a lithium-ion secondary battery, the manufacturing method disclosed in the disclosure is not limited to manufacturing a lithium-ion secondary battery. The disclosure can be applied to manufacturing various non-aqueous electrolyte secondary batteries in which an SEI layer can be formed in the initial charging step without any particular limitation.

In the first embodiment, charging is stopped in both the first layer forming step and the second layer forming step. However, it has been confirmed by experiments that as long as charging is stopped at least in the first layer forming step, it is possible to suppress the first layer and the second layer from being formed simultaneously and to manufacture a high-output non-aqueous electrolyte secondary battery. Thus, there may be cases in which the charging stop is preferably performed only in the first layer forming step in view of improving production efficiency.

The initial charging step S20 in the first embodiment includes two layer forming steps of the first layer forming step S22 and the second layer forming step S24. Alternatively, the initial charging step of the manufacturing method disclosed in the disclosure may include three or more layer forming steps. For example, when three peak voltages are observed in the differential capacity curve, a third layer forming step is preferably provided between the second layer forming step and the full charging step. At this time, the second specified voltage is preferably set between the second peak voltage and the third peak voltage, and the third specified voltage is preferably set to a voltage higher than the third peak voltage. Thereby, each of the first to third layers can be individually formed, and a suitable SEI layer can be formed. Further, when performing the third layer forming step, charging is preferably stopped in the second layer forming step. This suppresses the second layer and the third layer from being formed simultaneously, so that a more suitable SEI layer can be formed. Also, in view of improving output characteristics after manufacture, it is preferable to stop charging in the third layer forming step. Although detailed description is omitted to avoid repetition, when performing four or more layer forming steps, in each layer forming step, charging is preferably stopped after charging is performed at the specified voltage.

Test Examples

Hereinafter, test examples relating to the disclosure will be described. The following test examples are not intended to limit the disclosure.
1. Preparation of Battery Assembly A sheet-shaped positive electrode using lithium nickel cobalt manganese composite oxide ($Li_{1-x}Ni_{1/3}Co_{1/3}Mn_{1/3}O_2$) as a positive electrode active material was prepared, and a sheet-shaped negative electrode using graphite as a negative electrode active material was prepared. A separator (porous polyolefin sheet) was also prepared. Then, these sheet members were stacked and wound to prepare an electrode body. Next, a supporting salt ($LiPF_6$) was added, at a concentration of 0.1 mol/L, to a mixed solvent containing ethylene carbonate (EC), dimethyl carbonate (DMC), and ethyl methyl carbonate (EMC) in a volume ratio of EC:DMC:EMC=30:40:30, to prepare a non-aqueous electrolyte. In this test, a layer-forming agent (LiBOB) was added to the non-aqueous electrolyte at a concentration of 0.5 wt %. Then, the electrode body was accommodated in an aluminum battery case and then the non-aqueous electrolyte was poured into the case, thus preparing a battery assembly for evaluation.
2. Preparation of Samples
Sample 1

Initial charging was performed on the above battery assembly based on the following procedure to prepare a lithium ion secondary battery for testing (Sample 1). First layer forming step: With the first specified voltage set to 2.2 V, CC charging was performed until the voltage reached the first specified voltage, and then CV charging was maintained for 30 seconds. Second layer forming step: After the first layer forming step was completed, the CC charging was performed until the voltage reached the second specified voltage (3.18 V), and then the CV charging was maintained for 150 seconds. Full charging step: After the second layer forming step was completed, the CC charging at 20 A was performed until the voltage reached the full charging voltage (4 V), and then the charging mode was switched to the CV charging, and charging was performed until the current reached the end current (1 A).
Samples 2 to 5

The test lithium ion secondary batteries (Samples 2 to 5) were prepared under the same conditions as in Sample 1 except that charging was stopped to make the current 0 A after the CV charging in each of the first layer forming step and the second layer forming step. The stop time was set to two seconds in Sample 2, five seconds in Sample 3, 20 seconds in Sample 4, and 30 seconds in Sample 5.
Samples 6 to 9

The test lithium ion secondary batteries (Samples 6 to 9) were prepared under the same conditions as in Sample 1 except that charging was stopped after the CV charging in the first layer forming step. The stop time was set to two seconds in Sample 6, five seconds in Sample 7, 20 seconds in Sample 8, and 30 seconds in Sample 9.
Samples 10 to 13

The test lithium ion secondary batteries (Samples 10 to 13) were prepared under the same conditions as in Sample 1 except that charging was stopped after the CV charging in the second layer forming step. The stop time was set to two seconds in Sample 10, five seconds in Sample 11, 20 seconds in Sample 12, and 30 seconds in Sample 13.
2. Evaluation Tests Output of the prepared samples were measured. Specifically, under a temperature condition of −35° C., CC discharging at C/5 was performed on the lithium ion secondary battery for evaluation, and the output was measured after adjusting the state of charge (SOC) to 30%. The results of the output measurements of the samples are shown in FIG. 5.

Figure 5:
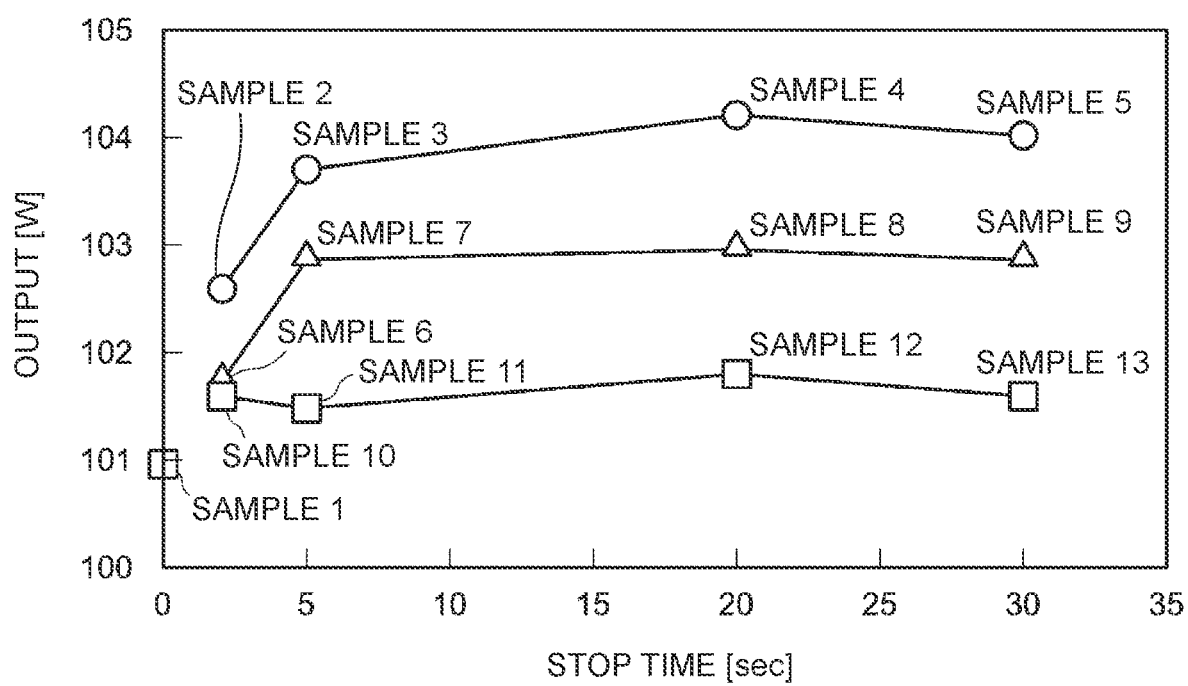
FIG. 5 is a graph showing a relationship between a stop time (sec) and an output (W) Of Samples 1 to 13.

As shown in FIG. 5, Samples 2 to 13 in which charging was stopped in one of the first layer forming step and the second layer forming step had improved output characteristics, compared to Sample 1 in which the charging stop was not performed.

Next, comparing Samples 2 to 13 in which the charging stop was performed, the highest output was observed in Samples 2 to 5 in which the charging stop was performed in both the first and second layer forming steps. Samples 6 to 9 in which the charging stop was performed in the first layer forming step exhibited higher outputs than Samples 10 to 13 in which the charging stop was performed in the second layer forming step. These results revealed that the output improvement effect by the charging stop is more suitably exhibited when the charging stop is performed in the first layer forming step. This is presumed to be because the overvoltage was mitigated by the charging stop, and the first layer and the second layer was suppressed from being formed simultaneously.

Also, comparing the stop times of Samples 2 to 13, it was found that the output improvement effect due to the charging stop was exhibited with a stop time of two seconds or more. Further, it was found that setting the stop time to five seconds or more exhibited a more suitable output improvement effect. On the other hand, since the output improvement effect was saturated with a stop time exceeding 20 seconds, it is understood that the upper limit of the stop time is preferably set to 30 seconds or less considering production efficiency.

Although specific examples of the disclosure have been described in detail above, these are merely examples and do not limit the scope of the claims. The technique described in the claims includes various modifications and changes of the specific examples given above.

What is claimed is:

1. A manufacturing method for a non-aqueous electrolyte secondary battery, the manufacturing method comprising:
    preparing a battery assembly in which an electrode body and a non-aqueous electrolyte are accommodated in a battery case; and performing an initial charging on the battery assembly, in the initial charging, a differential capacity curve of the battery assembly having a first peak voltage at which a first layer is formed on the electrode body and a second peak voltage that is a voltage higher than the first peak voltage and at which a second layer is formed on the electrode body, the initial charging including;

forming the first layer by stopping charging for a first stop time after charging to a first specified voltage that is set between the first peak voltage and the second peak voltage, and forming the second layer by charging the battery assembly to a second specified voltage that is set higher than the second peak voltage after forming the first layer.

2. The manufacturing method according to claim 1, wherein the first stop time in forming the first layer is 2 to 30 seconds.

3. The manufacturing method according to claim 1, wherein in forming the second layer, the charging is stopped for a second stop time after charging to the second specified voltage.

4. The manufacturing method according to claim 3, wherein the second stop time in forming the second layer is 2 to 30 seconds.

5. The manufacturing method according to claim 1, wherein the non-aqueous electrolyte includes a layer-forming agent and a solvent, the first layer is a solid electrolyte interface layer formed by the layer-forming agent being decomposed, and the second layer is a solid electrolyte interface layer formed by the solvent being decomposed.

6. The manufacturing method according to claim 5, wherein the layer-forming agent is lithium bis (oxalate) borate.

7. The manufacturing method according to claim 1, wherein forming the first layer includes;

performing a constant current charging in which a voltage is increased until the voltage reaches the first specified voltage, and performing a constant voltage charging in which the voltage is maintained at the first specified voltage for a predetermined time.

8. The manufacturing method according to claim 1, wherein forming the second layer includes;

performing a constant current charging in which a voltage is increased until the voltage reaches the second specified voltage, and performing a constant voltage charging in which the voltage is maintained at the second specified voltage for a predetermined time.

\* \* \* \* \*